US006355588B1

(12) United States Patent
Kalchauer et al.

(10) Patent No.: US 6,355,588 B1
(45) Date of Patent: Mar. 12, 2002

(54) PROCESS FOR TREATING FILTER DUSTS

(75) Inventors: Wilfried Kalchauer; Karl Hutzler, both of Burghausen; Hubert Bruckmeier, Simbach, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/514,034

(22) Filed: Feb. 25, 2000

(30) Foreign Application Priority Data

Mar. 10, 1999 (DE) .......................... 199 10 603

(51) Int. Cl.$^7$ ............................ C04B 35/00; A62D 3/00
(52) U.S. Cl. ................... 501/155; 588/256; 588/257
(58) Field of Search .................. 75/751, 961; 588/256, 588/257; 501/155

(56) References Cited

U.S. PATENT DOCUMENTS

| | | | | |
|---|---|---|---|---|
| 5,376,354 A | * | 12/1994 | Fischer et al. | 423/659 |
| 5,405,429 A | * | 4/1995 | Rey et al. | 75/434 |
| 5,968,230 A | * | 10/1999 | Okamoto et al. | 75/751 |
| 6,199,492 B1 | * | 3/2001 | Kuntstler | 440/342 |

OTHER PUBLICATIONS

Steel Times, Dec. 1993, "Processing EAF dust with Ausmelt technology", pp. 520–521, by Guorgi et al.

Steel Times, Jun. 1991, "Treatment of EAF dust by the Tetronics plasma process", pp. 301, 302 and 304 by Chapman et al.

* cited by examiner

Primary Examiner—Karl Group
(74) Attorney, Agent, or Firm—Brooks & Kushman P.C.

(57) ABSTRACT

The invention relates to a process for treating filter dusts which are produced during the melting of inorganic compounds, especially those containing fluorides and/or oxides, in which process the filter dusts are fused. The disposal of the fused filter dusts is simple.

15 Claims, No Drawings

PROCESS FOR TREATING FILTER DUSTS

TECHNICAL FIELD

The invention relates to a process for the simple disposal of filter dusts which are produced during the melting of inorganic compounds.

BACKGROUND ART

Electroremelting slags are used in the ESR process (electroslag remelting process) and serve, inter alia, for taking up certain impurities from the special steels and alloys which are to be produced. The inorganic slags used in this case are principally produced from aluminum oxide, calcium oxide and calcium fluoride compounds.

Steelworks slags likewise serve for purifying special steels, e.g. in ladle metallurgy, and as covering agents in the continuous casting process. The inorganic slags used in this case are principally produced from aluminum oxide and calcium oxide compounds.

Powdered fluxes are used in submerged arc welding (SAW process); they serve, inter alia, for protecting the welding zone against ingress of air, for improving arc stability, and for having specific metallurgical effects on the melting pool by calcining or burning off alloying elements. Powdered fluxes are principally produced from inorganic oxides and fluorides.

All of these slags and powdered fluxes are used in molten form and are produced by mixing the corresponding raw materials, which are generally of natural origin, for example with fluorite as a source of $CaF_2$, and fusing them. Depending on the process, this can take place directly at the planned point of use of the slags, but preferably the slags and powdered fluxes are melted in a separate furnace and then the mixtures, after solidifying, are crushed to a ready-to-use grain size, since this guarantees a constant slag quality having a low content of unwanted and interfering compounds. These products are termed premelted slags and powdered fluxes. The slags and fluxes may also be prepared by remelting slags and fluxes which have been prepared previously.

During the melting of these raw materials, therefore, various impurities introduced via the raw materials escape or evaporate. These are removed by suction together with the dusts which are formed by the furnace charging, and are deposited on suitable filters. The filter dust is low in $SiO_2$, because $SiO_2$ is not volatile at the melt temperatures. As there are as yet no appropriate possibilities for using these filter dusts, they must be disposed of.

Above ground disposal without pretreatment of these filter dusts is generally not possible, since, as described in the comparison example, the leaching criteria prescribed by the legislature for this type of deposition are not complied with. As a result, those skilled in the art consider suitable chiefly the following alternative disposal routes:

disposal in a below-ground deposit, if the appropriate requirements are met;

vitrification of the filter dusts, i.e. the dusts are fused together with a large amount of $SiO_2$ or products having a high $SiO_2$ content, so that the dusts are incorporated into the glass phase. It must be noted that if insufficient $SiO_2$ is incorporated, no glass phase can be formed;

the dusts are taken up with water by adding acid to a pH of below 7, nitrites are destroyed via an appropriate chemical treatment such as oxidation or reduction, water-soluble fluorides are bound by precipitation, for example by milk of lime, and then disposed in the wet state after filtration.

All these processes are relatively expensive, since either a subsurface disposal is required, or the mass of the substance to be disposed of is drastically increased by, for example, water or $SiO_2$, and/or complex working steps are required.

DISCLOSURE OF INVENTION

The invention relates to a process for treating filter dusts which are produced during the melting of inorganic compounds containing fluorides and oxides, in which process the filter dusts are fused without substantial addition of $SiO_2$ containing fluxes which would form a glass phase.

BEST MODE FOR CARRYING OUT THE INVENTION

It has been found that fusing the filter dusts in the absence of $SiO_2$ containing fluxes can decrease the eluable fluoride, nitrite, any heavy metals present, such as chromium and copper, and the water-soluble content, to such an extent that above ground disposal is possible without problems. When the filter dusts are melted, no vitreous melts are obtained.

Particular advantages of the process are that the disposal of the fused filter dusts is simple because the mass of material to be deposited is not increased, above ground deposition is possible in accordance with environmental regulations, and the process is simple to carry out.

The filter dusts can be fused in the same furnace in which the target products are produced. The melt temperature is preferably reduced by at least 100 K, in particular by at least 200 K, in comparison with the temperature required for producing the desired products. After complete fusion of the filter dusts used, the resultant melt preferably is immediately poured out of the furnace for cooling in order to reduce evaporation of volatile compounds as much as possible.

The inorganic compounds are preferably mixtures from which premelted slags and powdered fluxes are produced by melting. Preferably, the inorganic compounds are selected from aluminum oxide, calcium oxide and if appropriate other inorganic oxides in lesser amounts which are necessary to create the product properties which are required in the flux being prepared, and calcium fluoride.

In preparing the slags and fluxes, the inorganic components, depending on the particular slag or flux composition, are preferably melted at temperatures from 1400° C. to 1800° C., in particular at from 1500° C. to 1700° C. The melt is kept at this temperature for some time, in particular from one to two hours, in order to decrease the concentration of unwanted elements and compounds and in order to homogenize the mixture. At these temperatures, various impurities which were introduced via the raw materials and some of which are unwanted in the ready-to-use slags and powdered fluxes, escape or evaporate. Water-soluble fluorides, nitrites and heavy metal compounds are especially interfering. The compounds which are volatile at the process temperatures are removed by suction together with the dusts which are formed by the furnace charging and are deposited on suitable filters. The relatively high temperatures which are necessary to fuse the inorganic salts also form various nitrites in the gas phase over the melt and at the melt/air interface from nitrogen and oxygen. These nitrites likewise pass into the filter dust.

EXAMPLES

Comparison Examples 1–5 not According to the Invention

Filter dusts which are produced in the production of a
1. calcium-fluoride-containing ESR slag;

2. fluoride-free steelworks slag;
3. powdered flux type 280
4. powdered flux type 320
5. powdered flux type 380

(the products which give rise to the listed filter dusts during their manufacture are commercially available, for example from Wacker-Chemie GmbH), are analyzed as specified in DIN 38405-D10 for nitrite, DIN 38409-H1-2 for water-soluble content and DIN 38406-E22 for leachate with the result that the following limiting values are exceeded with the samples below (measured values in brackets):

| Sample 1: | water-soluble content (18.8%) |
|---|---|
| Sample 2: | nitrite (92 mg/l), water-soluble content (31.6%) |
| Sample 3: | fluoride (1695 mg/l), nitrite (34 mg/l), water-soluble content (28.7%) |
| Sample 4: | nitrite (578 mg/l) |
| Sample 5: | fluoride (455 mg/l), nitrite (40 mg/l), water-soluble content (11.2%). |

The "Zweite allgemeine Verwaltungsvorschrift zum Abfallgesetz (TA Abfall)" [Second general administrative regulations on the German waste act (technical regulations on waste)] 10/2.6, annex D—classification criteria, specifies the following limiting values for above ground storage:

| D4.13 fluoride in the leachate: | max. 50 mg/l |
|---|---|
| D4.20 water-soluble content: | max. 10% by weight |
| D4.18 nitrite in the leachate: | max. 30 mg/l. |

Independently of the environmental regulations, the following heavy metal concentrations were measured in the leachates:

| Sample 1: | copper 0.02 mg/l; chromium 0.09 mg/l |
|---|---|
| Sample 2: | copper 0.73 mg/l; chromium 0.89 mg/l |
| Sample 3: | chromium 0.20 mg/l |
| Sample 4: | chromium 0.08 mg/l |
| Sample 5: | chromium 0.30 mg/l |

Examples 6–10 According to the Invention

The filter dusts specified in the Comparison Examples 1–5 were introduced individually into an open furnace heated with carbon electrodes and fused. As soon as all of the material was fused, the furnace contents were poured out, cooled to room temperature and crushed to a grain size of less than 1 cm. The subsequent leachate analyses as specified in the DIN standards cited in Examples 1–5 found that no samples exceeded the limiting values of the technical regulations on waste or the limiting values for the stricter "Dritte allgemeine Verwaltungsvorschrift zum Abfallgesetz (TA Siedlungsabfall)—Deponieklasse II" [Third general administrative regulations on the German waste act (technical regulations on domestic waste)—landfill class II]. The leachates of the fused filter dusts from sample 2 also fall below the limiting values which are applicable to unsealed landfills (building rubble landfill).

The following heavy metal concentrations were measured in the leachates of the fused filter dusts:

| Sample 1: | copper <0.01 mg/l; chromium <0.01 mg/l |
|---|---|
| Sample 2: | copper <0.01 mg/l; chromium <0.01 mg/l |
| Sample 3: | chromium <0.01 mg/l |
| Sample 4: | chromium <0.01 mg/l |
| Sample 5: | chromium <0.01 mg/l. |

Comparison Example 11, not According to the Invention

The filter dust from Comparison Example 5 (powdered flux type 380) was fused again in a similar manner to Examples 6–10 with the modification that quartz sand ($SiO_2$) and burnt lime (CaO) were used as fluxes in order to obtain a vitreous phase (lime glass). The ratios used in parts by mass were 1 part of filter dust, 3 parts of quartz sand, 1 part of burnt lime. The leachate test subsequently found, in comparison to the sample fused without fluxes, no improvement with respect to assignment to a landfill class.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the consolidation of inorganic filter dusts collected from the preparation of slags and/or fluxes, said process comprising:
   melting inorganic compounds to form a melt or solidified melt during which filter dusts containing metal oxides and/or fluorides are generated;
   isolating said filter dust containing metal oxides and/or fluorides; the remainder of said process consisting essentially of:
   melting a composition consisting essentially of said filter dust in a furnace in the absence of a vitrifying amount of a silica-containing flux; and
   cooling to form a solid product.

2. The process of claim 1 wherein the filter dusts are melted at a temperature which is at least 100° K lower than the temperature required for producing said slag and/or flux.

3. The process of claim 1, wherein following melting of the filter dusts, the resultant melt is immediately poured out of the furnace to cool.

4. The process of claim 2, wherein following melting of the filter dusts, the resultant melt is immediately poured out of the furnace to cool.

5. The process of claim 1, wherein the inorganic compounds are melted to form said slag and/or flux at temperatures from 1400° C. to 1800° C.

6. The process of claim 1, wherein the inorganic compounds are melted to form said slag and/or flux at temperatures from 1400° C. to 1800° C.

7. The process of claim 3, wherein the inorganic compounds are melted at temperatures from 1400° C. to 1800° C.

8. The process of claim 1, wherein at least one of said inorganic compounds are selected from the group consisting of aluminum oxide, calcium oxide and calcium fluoride.

9. The process of claim 2, wherein at least one of said inorganic compounds are selected from the group consisting of aluminum oxide, calcium oxide and calcium fluoride.

10. The process of claim 1, wherein slags and/or fluxes which have been previously prepared from said inorganic compounds are fused a second time to form a slag and/or flux.

11. In a process for the preparation of a slag and/or flux by the melting or remelting of inorganic compounds, wherein volatile components and dusts are collected as filter dusts, the improvement comprising:

fusing said filter dusts without the addition of a vitrifying amount of a silica-containing flux to form a melt; and cooling said melt to form a solid, disposable waste product.

12. A process for consolidating filter dusts generated during the melting or remelting of inorganic compounds to form a flux and/or slag, said filter dusts comprising compounds generated by the volatilization of a melt comprising, in major part, inorganic compounds secreted from the group consisting of aluminum oxide, calcium oxide, and/or calcium fluoride, said process comprising isolating said filter dusts;

melting said filter dusts to form a filter dust melt without addition of a vitrifying amount of silica; and cooling said filter dust melt to form a solid product.

13. The process of claim 12 wherein said filter dust further contains at least one heavy metal.

14. The process of claim 13 wherein said heavy metal is one or more selected from the group consisting of chromium and copper.

15. The process of claim 13 wherein said filter dusts are melted at a temperature at least 100° K lower than the temperature of the melting of said inorganic compounds.

* * * * *